United States Patent
Culbertson et al.

(10) Patent No.: US 11,720,793 B2
(45) Date of Patent: Aug. 8, 2023

(54) VIDEO ANCHORS

(71) Applicant: Google LLC, Mountain View, CA (US)

(72) Inventors: Gabe Culbertson, Palo Alto, CA (US); Wei Peng, Fremont, CA (US); Nicolas Crowell, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 463 days.

(21) Appl. No.: 17/069,638

(22) Filed: Oct. 13, 2020

(65) Prior Publication Data

US 2021/0110163 A1   Apr. 15, 2021

Related U.S. Application Data

(60) Provisional application No. 62/914,684, filed on Oct. 14, 2019.

(51) Int. Cl.
| | |
|---|---|
| *G06N 3/08* | (2023.01) |
| *G06N 5/02* | (2023.01) |
| *G06V 20/40* | (2022.01) |
| *G06F 18/22* | (2023.01) |
| *G06F 18/23* | (2023.01) |
| *G06V 10/74* | (2022.01) |
| *G06V 10/762* | (2022.01) |

(52) U.S. Cl.
CPC .............. *G06N 3/08* (2013.01); *G06F 18/22* (2023.01); *G06F 18/23* (2023.01); *G06N 5/02* (2013.01); *G06V 10/761* (2022.01); *G06V 10/762* (2022.01); *G06V 20/41* (2022.01); *G06V 20/47* (2022.01); *G06V 20/44* (2022.01)

(58) Field of Classification Search
None
See application file for complete search history.

(56) References Cited

U.S. PATENT DOCUMENTS

| | | | |
|---|---|---|---|
| 2019/0243853 A1* | 8/2019 | Narasimha | G06V 20/49 |
| 2019/0258671 A1* | 8/2019 | Bou | G06F 16/7867 |

* cited by examiner

*Primary Examiner* — Chan S Park
*Assistant Examiner* — Elisa M Rice
(74) *Attorney, Agent, or Firm* — Dority & Manning, P.A.

(57) ABSTRACT

In one aspect, a method includes obtaining videos and for each video: obtaining a set of anchors for the video, each anchor beginning at the playback time and including anchor text; identifying, from text generated from audio of the video, a set of entities specified in the text, wherein each entity in the set of entities is associated with a times stamp at which the entity is mentioned; determining, by a language model and from the text generated from the audio of the video, an importance value for each entity; for a subset of the videos, receiving rater data that describes, for each anchor, the accuracy of the anchor text in describing subject matter of the video; and training, using the human rater data, the importance values, the text, and the set of entities, an anchor model that predicts an entity label for an anchor for a video.

20 Claims, 5 Drawing Sheets

VIDEO ANCHORS

CROSS-REFERENCE TO RELATED APPLICATIONS

This application claims the benefit under 35 U.S.C. § 119(e) of U.S. Patent Application No. 62/914,684, entitled "VIDEO ANCHORS," filed Oct. 14, 2019. The disclosure of the foregoing application is incorporated herein by reference in its entirety for all purposes.

BACKGROUND

This specification relates to video processing.

A video cannot be skimmed in the same way as web documents, and when a user is looking for something specific in a video, watching the video or manually scrubbing the video often does not result in the user finding the key moments in the video.

SUMMARY

This disclosure relates to computer implemented methods and systems that facilitate the creation and distribution of video anchors for a video, and more specifically, for training a model that can determine for each segment of a video, and entity label for a video anchor, where the entity label is descriptive of an entity that is relevant to a portion of video to which the video anchor corresponds.

In general, one innovative aspect of the subject matter described in this specification can be embodied in methods that include the actions of obtaining a plurality of videos, wherein each video is included in a resource page that also includes text, and for each video of the plurality of videos: obtaining a set of anchors for the video, each anchor in the set of anchors for the video beginning at the playback time specified by a respective time index value of a time in the video, and each anchor in the set of anchors including anchor text, identifying, from text generated from audio of the video, a set of entities specified in the text, wherein each entity in the set of entities is an entity specified in an entity corpus that defines a list of entities and is associated with a times stamp that indicates a time in the video at which the entity is mentioned, determining, by a language model and from the text generated from the audio of the video, an importance value for each entity in the set of entities, each importance value indicating an importance of the entity for a context defined by the text generated from the audio of the video; for a proper subset of the videos, receiving, for each video in the proper subset of videos, human rater data that describes, for each anchor for the video, the accuracy of the anchor text of the anchor in describing subject matter of the video beginning at the time index value specified by the respective time index value of the anchor; and training, using the human rater data, the importance values, the text generated from the audio of the videos, the set of entities, an anchor model that predicts an entity label for an anchor for a video. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The video timed anchors, which are referred to as "video anchors," or simply "anchors," change the way a playback environment operates. Specifically, the video anchors allow users to quickly ascertain key moments in the video, giving them a better sense of the video itself. The video timed anchors also allow users to directly skip to a point in the video, saving them time.

Because the video anchors indicate salient entities of the video, users are more likely to select the video anchors to initiate playback at certain points in the video instead of streaming the entire video. This reduces network bandwidth streaming usage, which conserves network resources. Additionally, on the client side, the user device video processing computation resources such as decoding and rendering are likewise reduced.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

The subject matter of this application trains a video anchor model to generate video timed anchors for different parts of a video. Each part of the video corresponding to a video anchor begins at a "key moment." A video timed anchor, which is generally referred to in this specification as an "anchor," or "video anchor," allows users to quickly ascertain important points in the video, giving them a better sense of the video itself, and also allow users to directly skip to a point in the video, saving them time.

The data defining the video anchors is stored in an index and associated with the video to which the data corresponds. The data causes a user device to render, in a video player environment of the user device, each of the video anchors. The data can then be served to user devices that request the video, along with the video itself. The system can provide, to a user device, the data in response to a video request. For each video anchor, the user device displays a corresponding time indicator in a progress bar of the video player, and a visual link from the corresponding time indicator to the visual anchor. Each displayed video anchor is selectable by a user and upon a selection of the video anchor the instruction of the video anchor causes the video player on a user device to begin playback of the video at the playback time specified by the time index value.

To generate the video anchor model, the system obtains videos and for each video: obtains a set of anchors for the video, each anchor beginning at the playback time and including anchor text, identifies, from text generated from audio of the video, a set of entities specified in the text, where each entity in the set of entities is associated with a times stamp at which the entity is mentioned, and determines, by a language model and from the text generated from the audio of the video, an importance value for each entity. For a subset of the videos, the system receives rater data that describes, for each anchor, the accuracy of the anchor text in describing subject matter of the video. The system trains, using the human rater data, the importance values, the text, and the set of entities, the video anchor model that predicts an entity label for an anchor for a video, and the time index for a video anchor that uses the entity label for anchor text. These features and additional features are described in more detail below.

Figure 1:
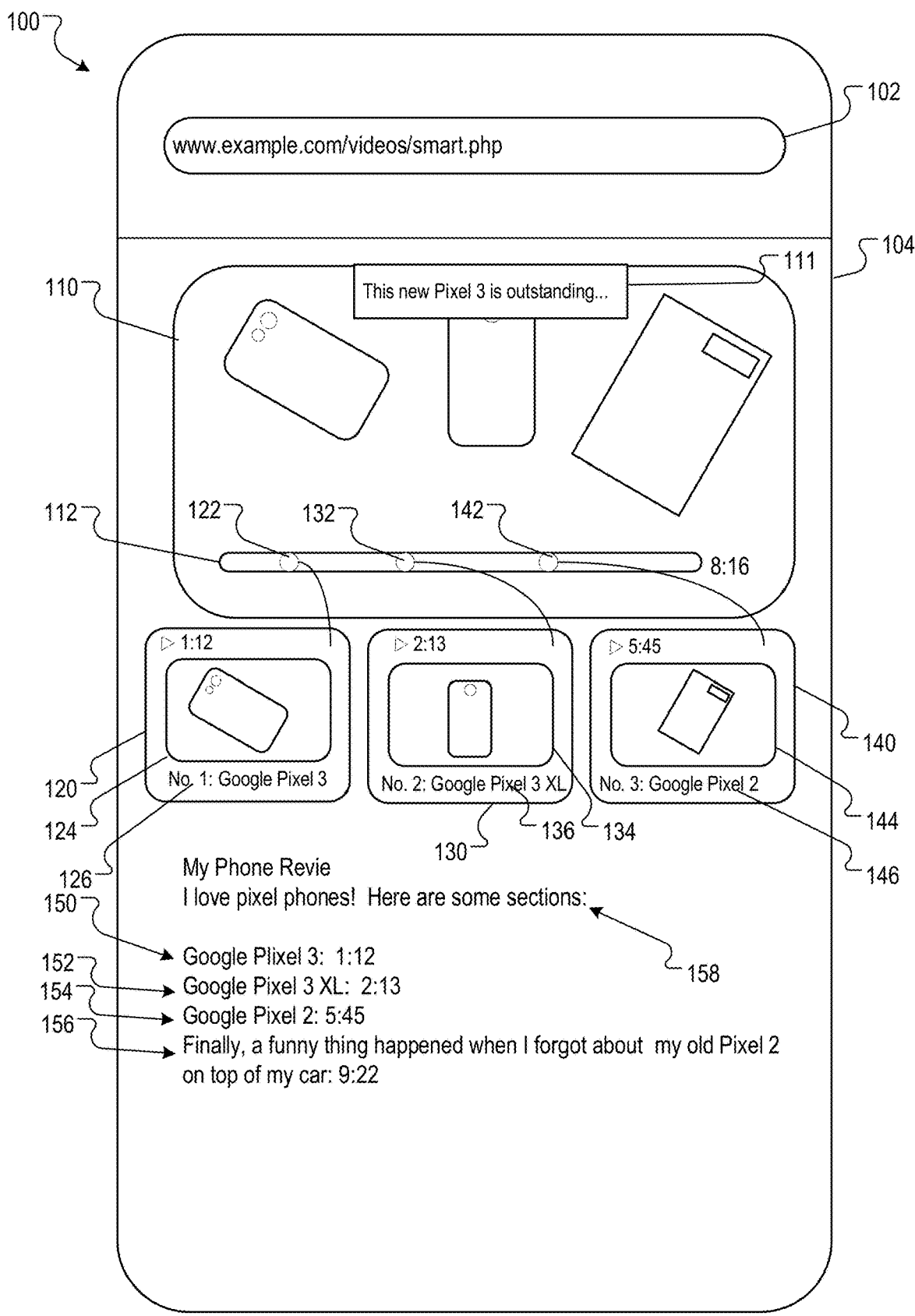
FIG. 1 is an illustration of a first video display environment in which video anchors are displayed.

FIG. 1 is an illustration of a first video display environment 100 in which video anchors 120, 130 and 140 are displayed. The example environment 100 may be implemented on a smart phone, a table, or a personal computer. Other computer-implemented devices, such as smart televisions, may also be used to implement the display environment 100.

In the example environment 100 of FIG. 1, a video 110 is displayed in a display environment 104 for a resource page addressed by the resource address 102. A first frame of the video is displayed and a progress bar 112 indicates a time length of the video.

Beneath the video player window 110 are three video anchors 120, 130 and 140. Each video anchor 120, 130 and 140 has a corresponding time indicator 122, 132 and 142 in the progress bar 112 of the video player. Each time indicator corresponds to a playback time specified by a time index value for the video anchor. Additionally, each video anchor 120, 130 and 140 includes a visual link from the corresponding time indicator 122, 132 and 142 to the video anchor.

Also shown is a portion of caption text 111. The caption text 111 may be derived from automatic speech recognition of speech in the video, or may be manually annotated.

Each video anchor 120, 130 and 140 respectively includes a video frame 124, 134 and 144. Each video frame is selected from a portion of the video that occurs at or after a corresponding playback time in the video.

Each video anchor 120, 130 and 140 also respectively includes an entity label 126, 136 and 146 that each describe a salient topic in the video. In some implementations, each salient topic is identified when it is a new topic or a significant change in a topic of the video. How salient topics are identified is described in more detail below.

Embedded in each video anchor 120, 130 and 140 is a respective instruction that causes the video player on the user device to begin playback of the video at the playback time specified by the time index value. The instruction is executed upon selection of a video anchor. For example, should a user select the video anchor 130, playback of the video in the video player window 110 would begin at the playback time of 2:13, as indicated in the video anchor 130 and in the progress bar 112.

Video anchors can also be displayed in other ways. For example, beneath the video anchors 120, 130 and 140 are video anchors 150, 152, 154 and 152. These anchors 150, 152, 154 and 156 are displayed in textual form with a time index value. Selection of an anchor 150, 152, 154 and 156 will causes the video player on the user device to begin playback of the video at the playback time specified by the time index value. The video anchors 150, 152, 154 and 156 correspond to the video anchors 120, 130 and 140. In some implementations, only video anchors of the form of video anchors 120, 130 and 140 or of the form of video anchors 150, 152, 154 and 156 are shown.

Additionally, more video anchors may be indicated by corresponding additional time indicators in the progress bar 112, and access to the video anchors may be realized by a gesture input, e.g., by swiping from right to left to "scroll" through the additional video anchors by introducing a next video anchor at the location of video anchor 140, and shift the video anchor 140 into the position of the video anchor 130, and likewise shifting the video anchor 130 into the position of video anchor 120. The first video anchor 120 is also removed from the display. Any other appropriate interaction model may also be used to access additional video anchors.

In some implementations, the system can decide whether to include an image of a video frame in a video anchor based on one or more video frame inclusion criteria. Because each video anchor has a limited amount of screen real estate, the decision of whether to include an image generated from a video frame in a video anchor ensures that the data displayed for each video anchor differentiates from each other video anchor. In other words, video frames that are not informative of the salient topic to which the video anchor corresponds can, in some implementations, be omitted from the video anchor. For example, if a video is of a lecture and only has video of a speaker, an image of the speaker for each video anchor is not informative. Thus, by not using a video frame in the video anchor, a more descriptive entity label may be used, where each entity label describes the subject that the speaker is discussing.

In some implementations, the image generated from a selected video frame is a thumbnail of the video frame. As used in this description, a "thumbnail" of the video frame is any image of the video frame that is dimensionally smaller than the actual video frame that the thumbnail depicts. In other implementations, the image may be a cropped portion of the video frame, e.g., a portion of the video frame that includes an object to be most relevant to the salient topic determined for the key moment identifier. Any appropriate object detection process can be used to detect and identify objects determined in a video frame.

Often the key content of a video is in the speech of the video. Using automatic speech recognition (ASR), some systems analyze this speech and determine important topics as video anchors. But extracting useful information out of ASR alone presents challenges, as the data is very noisy. Mistakes in recognition (e.g. "lug" recognized as "rug"), issues with converting spoken language to written language (e.g., inclusion of filler like "um, yeah, and so . . . ") and a lack of transcript organization (e.g., no sentence breaks or paragraphs) make ASR alone difficult to use for determining video anchors. To overcome this noise, the system described herein, in some implementations, makes use of a knowledge graph, salient terms of video pages and a language model (such as the Bidirectional Encoder Representations from Transformer language mode, or "BERT") for understanding entity mention context.

Figure 2:
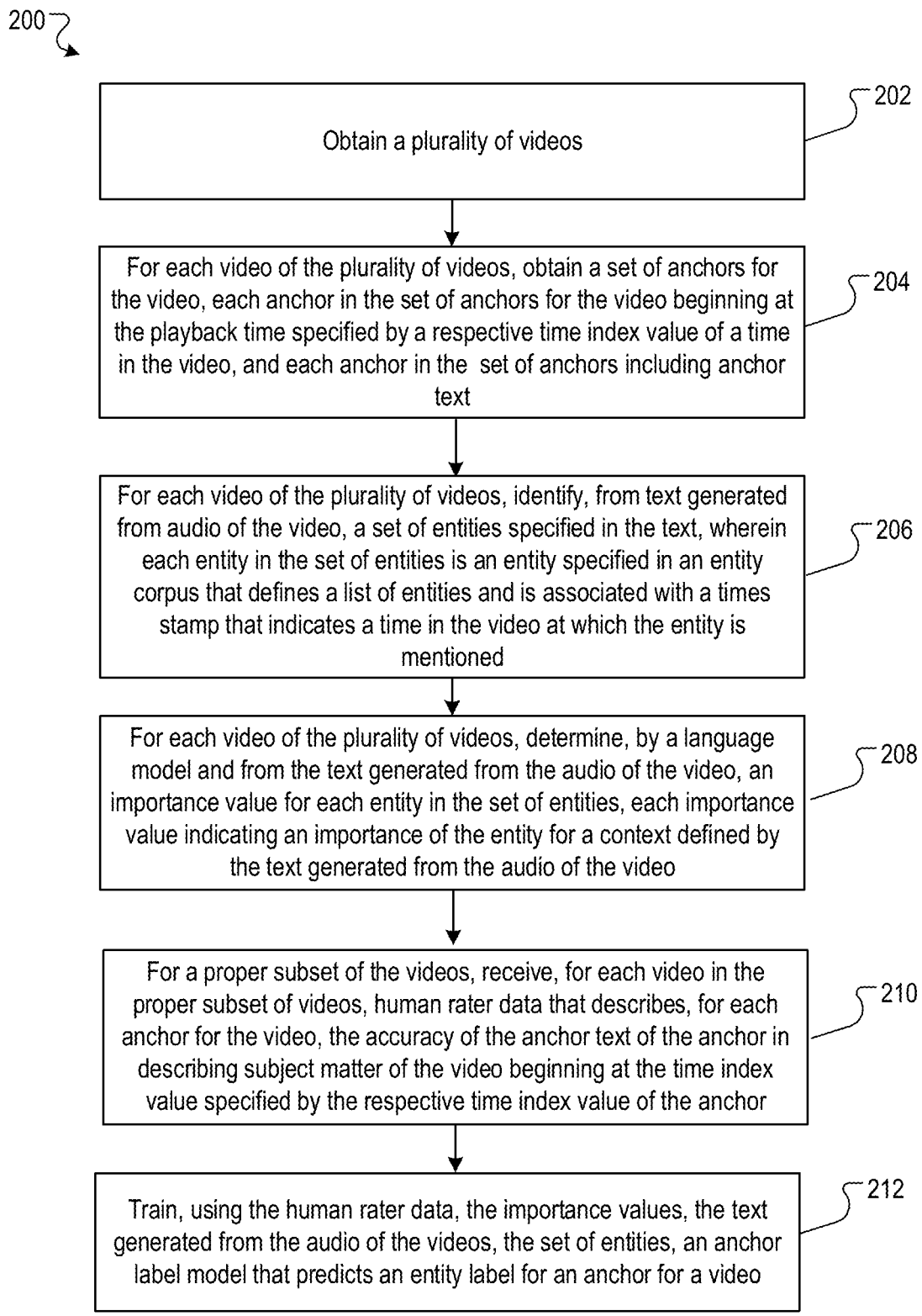
FIG. 2 is a flow diagram illustrating an example process for training a video anchor model that selects descriptive anchors for a subset of video.

FIG. 2 is a flow diagram illustrating an example process 200 for training a video anchor model that selects descriptive anchors for a subset of video beginning at a particular time. Steps 202-208 are used to generate training data for training an anchor label model, and the final two steps, 210 and 212, are used to train the anchor label model using the data generated. The process 200 can be implemented a data processing apparatus of one or more computers. Operation of the process 200 will be described with reference to FIGS. 3-5.

The process 200 obtains a plurality of videos (202). The videos, in some implementations, are videos that are each included in a resource with text, such as the video 110 of FIG. 1, which includes text 158 in addition to the text of video anchors.

The process 200, for each video of the plurality of videos, obtains a set of anchors for the video, each anchor in the set of anchors for the video beginning at the playback time specified by a respective time index value of a time in the video, and each anchor in the set of anchors including anchor text (204). For example, as shown in FIG. 1, the text for the video 150, 152, 154 and 156 are obtained, "Google Pixel 3," Google Pixel 3 XL," Google Pixel 2," and "Finally, a funny thing happened when I forgot about my old Pixel 2 on top of my car." In this example, the anchors have been added by a human curator, such as by the person that uploaded the video 110 to a network.

Figure 3:
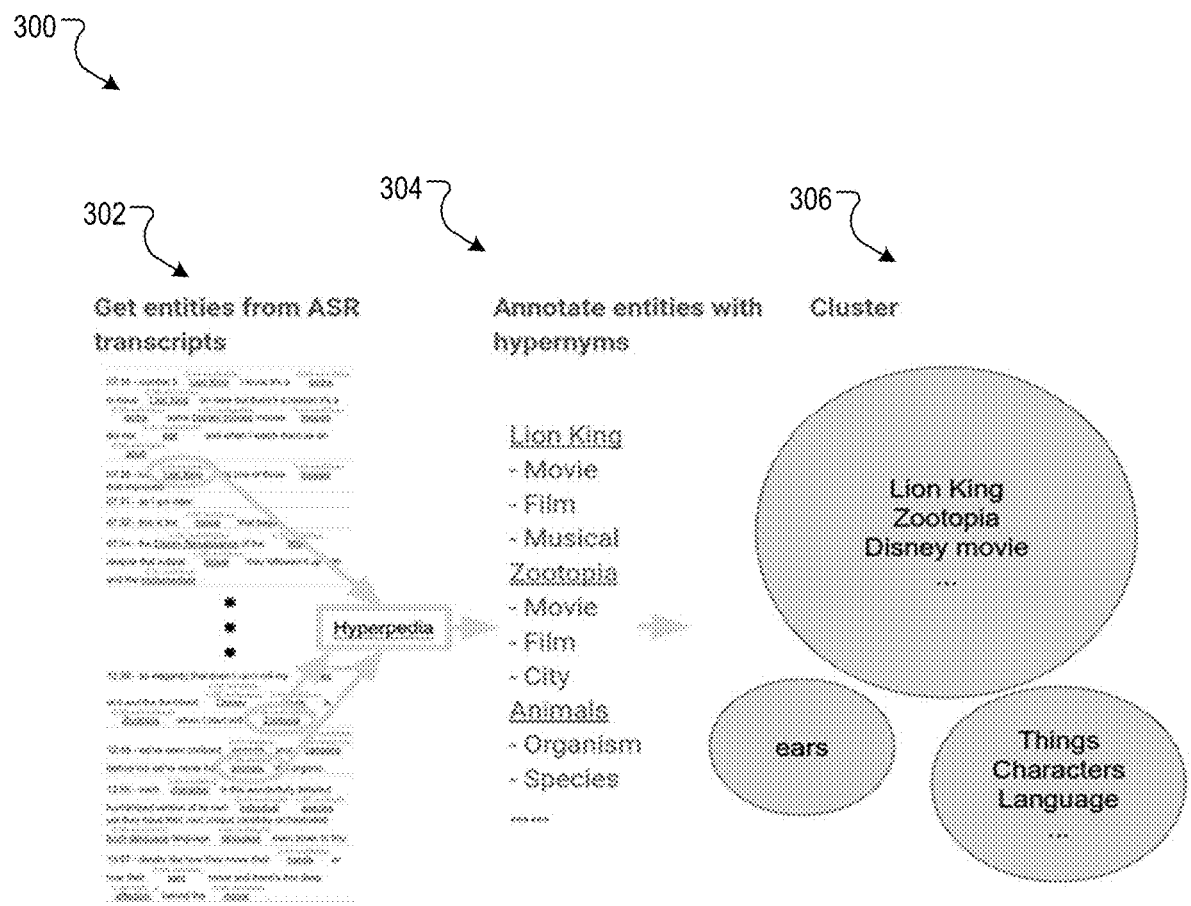
FIG. 3 is a process flow diagram illustrating an example entity clustering process.

The process 200, for each video of the plurality of videos, identifies, from text generated from audio of the video, a set of entities specified in the text, wherein each entity in the set of entities is an entity specified in an entity corpus that defines a list of entities and is associated with a times stamp that indicates a time in the video at which the entity is mentioned (206). In some implementations, a list of entities associated with time stamps is generated for each video. However, in other implementations, additional processing and filtering can be done. One example process for determining entities and then performing additional processing and filtering is illustrated in FIG. 3, which is a process flow diagram 300 illustrating an example entity clustering process. Other processes, however, can also be used.

The flow diagram 300 in FIG. 3 begins with generating, for the video, a list of entities from the ASR transcript. An ASR transcript 302 is generated for a video, and then entities and their corresponding times stamps are identified. To identify entities, the system can, in some implementation, identifying an entity only when the entity has a unique entry in a knowledge graph or some other pre-defined data set of entities.

Then, for each identified entity, hypernyms for the entity are determined, as shown by the hypernym lists 304. As used in this specification, a hypernym is a word with a broad meaning that more specific words fall under; a superordinate. For example, color is a hypernym of red. The hypernym can be determined from a language mode, a hypernym database, or any other hypernym data source.

The entities are then clustered based on a similarity of the hypernyms, as indicated by the clusters 306. The clusters may then be used for training the anchor model. In some implementations, clusters are filtered, and clusters that do not meet filtering criteria may be excluded from training data. Filtering criteria can include one or more of: broadness of the entities in an entity cluster, a minimum number of entities in the entity cluster, and a similarity threshold of the hypernyms of entities that belong to the entity cluster and salient terms determined for the video. For example, entities that are too broad, e.g., "animal" instead of "lion," may be excluded. An entity may be predefined in a hierarchy as being too broad, e.g., a "genus" type entity may be defined as too broad, or an entity may be defined as too broad if there are relatively few hypernyms that are superordinate to the entity. Other ways of determining an overly broad entity can also be used.

A minimum number of entities in a cluster may be a predefined number, e.g., three. Generally, a cluster with only one entity may be indicate the entity is not a main subject or significant subject of the video.

Figure 4:
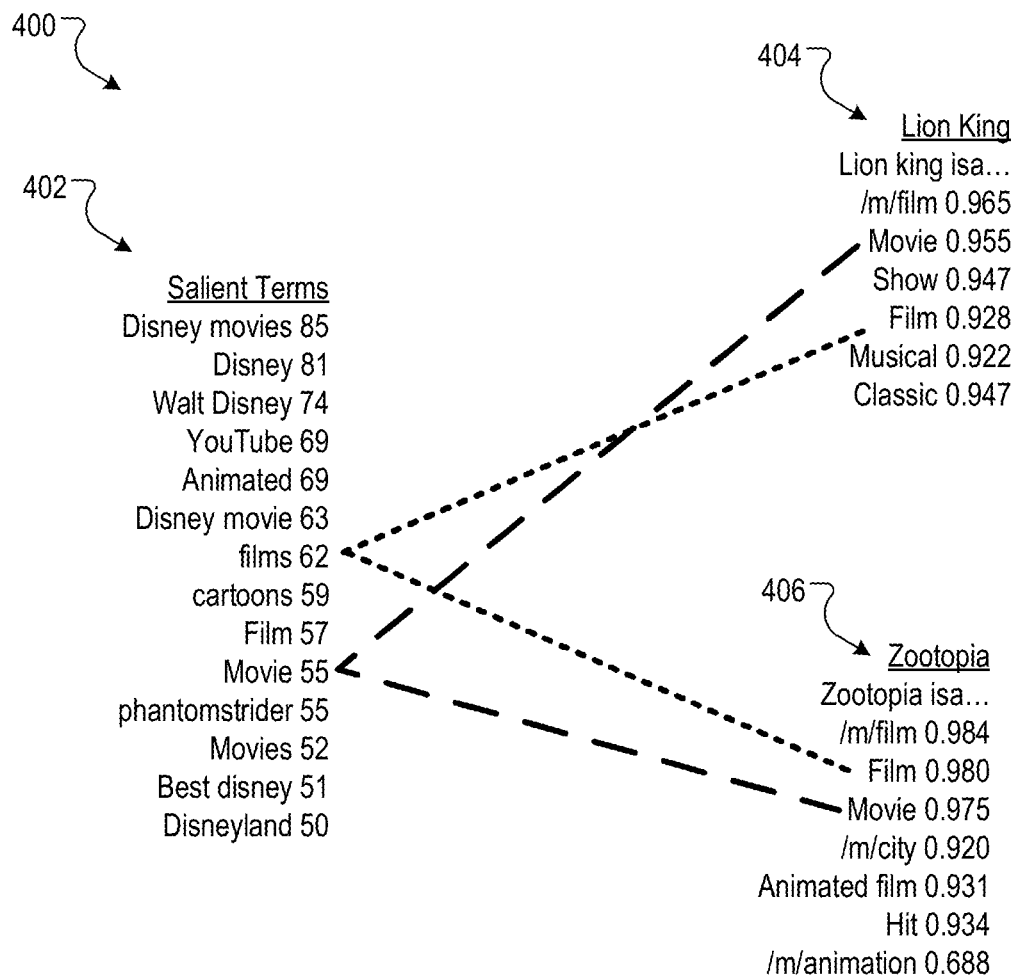
FIG. 4 is a diagram illustrating an entity salience calculation.

Another filtering technique is a cluster meeting similarity threshold of the hypernyms of entities that belong to the entity cluster and salient terms determined for the video. Salient terms are terms that are descriptive of the video. In some implementations, the salient terms may be determined from the text of the resource that includes the video, e.g., the title of a webpage, comments, a video summary, etc. In still other implementations, the terms may also be determined, in part, from the ASR data, or a combination of both. Similarity can be determined by cosine similarity or other similarity measure. In some implementations, similarity can be based on hypernyms of an entity for each entity, as illustrated in FIG. 4, which is a diagram 400 illustrating an entity salience calculation. As illustrated in FIG. 4, a list of salient terms 402 has been determined for a particular resource on which a video is shown. Entity hypernym lists 404 and 406 have also been determined for the entities "Lion King" and "Zootopia." Each salient term has a weight indicating a relevance of the term to the resource page. Likewise, each hypernym has a weight indicating a relevance of the hypernym to the entity. The lists can be represented as vectors to determine similarity.

Figure 5:
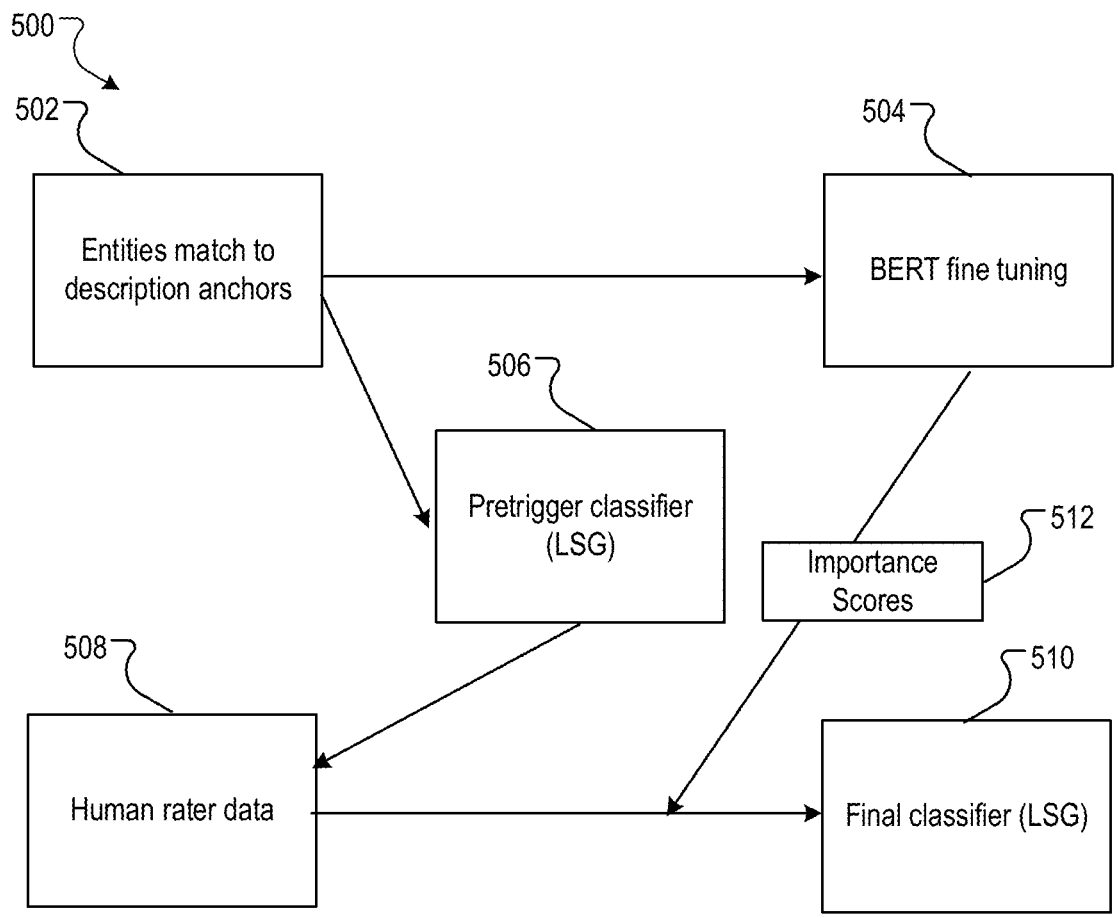
FIG. 5 is a block diagram of an example training process flow.

While filtering has been described as occurring before generating training data, in other implementations filtering can be done a part of the pretrigger classifier 506 of FIG. 5.

Following the filtering, a model is trained using content uploader annotations to identify which clusters are most likely to contain useful lists, and BERT model is trained using ASR text to infer if the context where the entity was mentioned suggests it is a key entity. Candidate clusters are finally scored using a model trained with human rater data. A final classifier is then trained.

FIG. 5 is a block diagram 500 of an example training process flow. In FIG. 5, the data includes entities matched to description anchors 502. This data can be derived as described above for each video in a set of videos, e.g., by steps 202-206.

The process 200, for each video of the plurality of videos, determines, by a language model, e.g., BERT, and from the text generated from the audio of the video, an importance value for each entity in the set of entities, each importance value indicating an importance of the entity for a context defined by the text generated from the audio of the video (208). This is illustrated in FIG. 5 by the BERT fine tuning process 504. While the salience and relevance signals listed above provide a foundational data set for training, those signals alone do not make use of a linguistic mention context. This means passing mentions may be identified as anchors. For example, in a video about the best Disney movies if the ASR is "Now I'm going to talk about my favorite movie Frozen. While some say it's not as good as Lion King . . . ", Lion King may be identified as an anchor because the hypernyms will suggest that it fits in well with other Disney movies and is relevant to the web document and video. However, from the sematic meaning of the ASR text, it is clear that creating an anchor with the label "Lion King" would not be helpful. Therefore, a language classifier, such as a BERT classifier, is trained to make use of the ASR text, and, optionally, title text and the entity ASR mention text, to make use of ASR context to better identify important entity mentions. In some implementation, each entity mention at each time is score based on the language model. A higher score indicates a higher prediction confidence that the entity mention at the particular time would make a suitable anchor text.

The process 200, for a proper subset of the videos, receives, for each video in the proper subset of videos, human rater data that describes, for each anchor for the video, the accuracy of the anchor text of the anchor in describing subject matter of the video beginning at the time index value specified by the respective time index value of the anchor (210). The videos from which the data are generated can be selected based on training selection criteria. Because identifying good candidate videos for entity anchors is non-trivial, training data is broken into: (1) a large set of automatically generated training data using video descriptions and (2) a smaller set of human rated data where videos are selected using a model trained with the larger data set. The larger dataset is not used directly because the videos do not have the same distributions of signals as videos selected at random. As described above, many videos have timestamped labels in the description that can be extracted as video anchors. This is used as training data for entity anchors by identifying those description anchors that have associated knowledge graph unique entries and finding mentions of those entries in the ASR text. Although there may be sources of noise in this data, e.g., content creators may mislabel or mistime their annotations, unidentified entities, such anchors selected according to is procedure tend to be accurate.

Training data is constructed by (1) determining entity mentions in anchor text, (2) finding those entities that are also mentioned in the ASR text, (3) selecting videos where at least a certain percentage (e.g., 50%) of the anchors have identified entries and are in the ASR text, and (4) creating negative examples by selecting other random entity mentions in the ASR text.

As described above, the system constructs a document that is a list with each anchor text for each anchor as a list item. In some implementations, each entity mention must cover a minimum percentage of the text (e.g., 60%) to be considered. This avoid cases where the key moment is not thoroughly described by the entity, e.g., in FIG. 1, the anchor text "Finally, a funny thing happened when I forgot about my old Pixel 2 on top of my car" would result in the anchor text not being identified as an entity label, because the entity Pixel 2 constitutes only a small percentage of text in the anchor text.

Those videos without enough anchors labeled as entities and those entities appearing in the ASR text are skipped. In some implementation, least 50% of anchors must meet these criteria to be used as examples, but other thresholds can be used. In cases where videos do not have enough entities found in the ASR text, the videos are skipped.

Any entity mention that is not matched to a description anchor is likely not a good anchor, so a random selection of these mentions is made by the system as negative examples. In some implementations, three negative examples are generated for each positive example.

For training, the main signals used for training come from Hyperpedia hypernyms (used for clustering) and salient terms (used for relevance), generated as described above. Entities are clustered using the cosine similarity between sets of hypernyms. After clustering, scoring signals are calculated for both the cluster and, in some implementations, each individual anchor. Various signals that can be used, including mentions, broadness, cluster size, cluster salience, cluster entities in the entity database, and cluster mentions.

The number of times an entity is mentioned in the ASR text is a mention metric. Though more mentions generally means the entity is more important, in some cases being mentioned too many times may mean the entity is too general to be useful as an anchor. For example, in a video about "travel in Japan", "Japan" may be relevant and mentioned many times, but it is not useful as an anchor because it is too general.

The number of times in a hypernym database an entity is a category ("something is a <category>") divided by the number of times the entity is an instance ("<instance> is a something") is a broadness metric. Very broad entities are generally not useful anchors (e.g. "person", "mountain"). Thus, a broadness threshold can be used to weight entities based on broadness.

Larger clusters result in a larger cluster size metric. This tends to indicate that the entities are more relevant for the video than entities with small cluster size metrics.

The cosine similarity between the cluster hypernyms and the document salient terms is a measure of similarity. The more similar the cluster hypernyms and the document salient terms, the more relevant the entities are.

Cluster entities in the entity database are another relevance metric. If many entities in the cluster appear in the entity database, the cluster is more likely to be relevant to the page on which the video is displayed.

Yet another metric is cluster mentions. If the entities in the cluster are mentioned many times in the ASR text, the cluster is more likely to be important.

Using the description anchors training data and the features described above, a pre-trigger classifier is trained to select a subset of videos for rating by humans. In some implementations, a layered smooth gain (LSG) model is trained to select a small sample of videos, e.g., 2%, for human rating. In some implementations, the model 504 is trained with description anchor data describe above with a threshold at 80% recall as a filter (other thresholds can be used). The selected videos from the set are sent to human raters to use as in training a final classifier. Raters are asked to rate each anchor for how well the anchor describes the moment in the video and how useful it would be to jump to that moment. The rating data are stored as human rater data 508.

The process 200 trains, using the human rater data, the importance values, the text generated from the audio of the videos, and the set of entities, an anchor model that predicts an entity label for an anchor for a video (212). As illustrated in FIG. 5, the final classifier 510 is trained using the human rater data 508, the set of entities, the important values, the text generated from the audio the videos, and the language importance scores 512. The final classifier 510 may be a LGS classifier that is similar to the pre-trigger classifier 506, or, alternatively, may be a different type of classifier. By use of the human rater data 508, and the importance scores 512 from the language model, precision of the final classifier 510 can exceed the precision of the pre-trigger classifier 506. Moreover, recall of the final classifier 510 can be reduced relative to the recall of the pre-trigger classifier 506. This results in a final classifier 510 that performs objectively better than the pre-trigger classifier 506.

After training, the final classifier 510 can be used to determine for a video hosted on a resource page a set of video anchors. Each video anchor will include text that is predicted to be descriptive of the content of the video at any particular time index in the video. This data can then be used to generate a video anchor that uses the text as video anchor text, and that when selected, causes the video to play at the time index.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    obtaining a plurality of videos, and for each video of the plurality of videos:
        obtaining a set of anchors for the video, each anchor in the set of anchors for the video beginning at the playback time specified by a respective time index value of a time in the video, and each anchor in the set of anchors including anchor text;
        identifying, from text generated from audio of the video, a set of entities specified in the text, wherein each entity in the set of entities is an entity specified in an entity corpus that defines a list of entities and is associated with a times stamp that indicates a time in the video at which the entity is mentioned;
        determining, by a language model and from the text generated from the audio of the video, an importance value for each entity in the set of entities, each importance value indicating an importance of the entity for a context defined by the text generated from the audio of the video;
    for a proper subset of the videos, receiving, for each video in the proper subset of videos, human rater data that describes, for each anchor for the video, the accuracy of the anchor text of the anchor in describing subject matter of the video beginning at the time index value specified by the respective time index value of the anchor; and
    training, using the human rater data, the importance values, the text generated from the audio of the videos, the set of entities, an anchor model that predicts an entity label for an anchor for a video at a particular time in the video.

2. The computer-implemented method of claim 1, further comprising, for each video, determining salient terms for the video, where each salient term is a term that is descriptive of the video; and
    wherein training the anchor model further comprises training the anchor model using the salient terms.

3. The computer-implemented method of claim 2, wherein identifying, from text generated from audio of the video, a set of entities specified in the text comprises:
    determining hypernyms for each entity;
    clustering the entities into entity clusters based on a similarity of the hypernyms; and
    filtering entity clusters that are determined to not meet filtering criteria.

4. The computer-implemented method of claim 3, wherein the filtering criteria includes one or more of: broadness of the entities in an entity cluster, a minimum number of entities in the entity cluster, and a similarity threshold of the hypernyms of entities that belong to the entity cluster and the salient terms determined for the video.

5. The computer-implemented method of claim 1, wherein obtaining the plurality of videos comprises, for each video of the plurality of videos, obtaining the video only if the video includes a minimum plurality of anchors in the set of anchors.

6. The computer-implemented method of claim 1, wherein identifying a set of entities specified in the text comprises identifying an entity only when the entity has a unique entry in a knowledge graph.

7. The computer-implemented method of claim 1, further comprising:
    providing, after training the anchor label model and as input to the anchor model, a video; and
    receiving, as output from the anchor model, a set of anchors for the video, each anchor in the set of anchors for the video beginning at the playback time specified by a respective time index value of a time in the video, and each anchor in the set of anchors including anchor text that is predicted to be descriptive of subject matter in the video beginning at the time index value.

8. A system, comprising:
    a data processing apparatus; and
    a non-transitory computer readable medium in data communication with the data processing apparatus and storing instructions executable by the data processing apparatus and that upon such execution cause the data processing apparatus to perform operations comprising:
        obtaining a plurality of videos and for each video of the plurality of videos:
            obtaining a set of anchors for the video, each anchor in the set of anchors for the video beginning at the playback time specified by a respective time index value of a time in the video, and each anchor in the set of anchors including anchor text;
            identifying, from text generated from audio of the video, a set of entities specified in the text, wherein each entity in the set of entities is an entity specified in an entity corpus that defines a list of entities and is associated with a times stamp that indicates a time in the video at which the entity is mentioned;

determining, by a language model and from the text generated from the audio of the video, an importance value for each entity in the set of entities, each importance value indicating an importance of the entity for a context defined by the text generated from the audio of the video;

for a proper subset of the videos, receiving, for each video in the proper subset of videos, human rater data that describes, for each anchor for the video, the accuracy of the anchor text of the anchor in describing subject matter of the video beginning at the time index value specified by the respective time index value of the anchor; and training, using the human rater data, the importance values, the text generated from the audio of the videos, the set of entities, an anchor model that predicts an entity label for an anchor for a video at a particular time in the video.

9. The system of claim 8, the operations further comprising, for each video, determining salient terms for the video, where each salient term is a term that is descriptive of the video; and wherein training the anchor model further comprises training the anchor model using the salient terms.

10. The system of claim 9, wherein identifying, from text generated from audio of the video, a set of entities specified in the text comprises:

determining hypernyms for each entity;

clustering the entities into entity clusters based on a similarity of the hypernyms; and filtering entity clusters that are determined to not meet filtering criteria.

11. The system of claim 10, wherein the filtering criteria includes one or more of: broadness of the entities in an entity cluster, a minimum number of entities in the entity cluster, and a similarity threshold of the hypernyms of entities that belong to the entity cluster and the salient terms determined for the video.

12. The system of claim 8, wherein obtaining the plurality of videos comprises, for each video of the plurality of videos, obtaining the video only if the video includes a minimum plurality of anchors in the set of anchors.

13. The system of claim 8, wherein identifying a set of entities specified in the text comprises identifying an entity only when the entity has a unique entry in a knowledge graph.

14. The system of claim 8, further comprising:

providing, after training the anchor label model and as input to the anchor model, a video; and receiving, as output from the anchor model, a set of anchors for the video, each anchor in the set of anchors for the video beginning at the playback time specified by a respective time index value of a time in the video, and each anchor in the set of anchors including anchor text that is predicted to be descriptive of subject matter in the video beginning at the time index value.

15. A non-transitory computer readable medium storing instructions executable by the data processing apparatus and that upon such execution cause the data processing apparatus to perform operations comprising;

obtaining a plurality of videos and for each video of the plurality of videos:

obtaining a set of anchors for the video, each anchor in the set of anchors for the video beginning at the playback time specified by a respective time index value of a time in the video, and each anchor in the set of anchors including anchor text;

identifying, from text generated from audio of the video, a set of entities specified in the text, wherein each entity in the set of entities is an entity specified in an entity corpus that defines a list of entities and is associated with a times stamp that indicates a time in the video at which the entity is mentioned;

determining, by a language model and from the text generated from the audio of the video, an importance value for each entity in the set of entities, each importance value indicating an importance of the entity for a context defined by the text generated from the audio of the video;

for a proper subset of the videos, receiving, for each video in the proper subset of videos, human rater data that describes, for each anchor for the video, the accuracy of the anchor text of the anchor in describing subject matter of the video beginning at the time index value specified by the respective time index value of the anchor; and training, using the human rater data, the importance values, the text generated from the audio of the videos, the set of entities, an anchor model that predicts an entity label for an anchor for a video at a particular time in the video.

16. The non-transitory computer readable medium of claim 15, further comprising, for each video, determining salient terms for the video, where each salient term is a term that is descriptive of the video; and wherein training the anchor model further comprises training the anchor model using the salient terms.

17. The non-transitory computer readable medium of claim 16, wherein identifying, from text generated from audio of the video, a set of entities specified in the text comprises:

determining hypernyms for each entity;

clustering the entities into entity clusters based on a similarity of the hypernyms; and filtering entity clusters that are determined to not meet filtering criteria.

18. The non-transitory computer readable medium of claim 17, wherein the filtering criteria includes one or more of: broadness of the entities in an entity cluster, a minimum number of entities in the entity cluster, and a similarity threshold of the hypernyms of entities that belong to the entity cluster and the salient terms determined for the video.

19. The non-transitory computer readable medium of claim 15, wherein obtaining the plurality of videos comprises, for each video of the plurality of videos, obtaining the video only if the video includes a minimum plurality of anchors in the set of anchors.

20. The non-transitory computer readable medium of claim 16, wherein each video is included in a resource page that also includes text, and the salient terms are determined from the text included in the resource page.

* * * * *